United States Patent [19]
Grimaldi et al.

[11] Patent Number: 5,913,572
[45] Date of Patent: Jun. 22, 1999

[54] MULTI-ROLLER BEACH CHAIR

[76] Inventors: Camille M. Grimaldi, 175 Zoe St., Apt. 6B, Staten Island, N.Y. 10305; Janice Moschetta, 318 Knight Ct.; Barbara Wagner, 287 Bishop Ct., both of Old Bridge, N.J. 08857

[21] Appl. No.: 09/146,910

[22] Filed: Sep. 4, 1998

Related U.S. Application Data

[63] Continuation-in-part of application No. 08/901,496, Jul. 28, 1997, Pat. No. 5,845,969.

[51] Int. Cl.[6] ....................................................... A47C 7/02
[52] U.S. Cl. .................. 297/452.19; 297/39; 297/188.04; 297/188.14; 297/411.32; 297/452.21; 297/452.3
[58] Field of Search .................... 297/188.04, 188.14, 297/445.1, 452.3, 35, 39, 16.1, 463.2, 452.21, 452.2, 452.19, 452.18, 445.2, 447.1, 447.2, 411.2, 411.42; 280/205, 78

[56] References Cited

U.S. PATENT DOCUMENTS

| | | |
|---|---|---|
| 2,652,882 | 9/1953 | Kotler . |
| 2,906,319 | 9/1959 | Goldstein . |
| 3,290,089 | 12/1966 | Farrell . |
| 5,004,296 | 4/1991 | Ziegenfuss, Jr. . |
| 5,110,184 | 5/1992 | Stein et al. . |
| 5,570,926 | 11/1996 | Papiernik et al. . |

FOREIGN PATENT DOCUMENTS

| | | |
|---|---|---|
| 163437 | 12/1985 | European Pat. Off. . |
| 90/07889 | 7/1990 | WIPO . |

*Primary Examiner*—Milton Nelson, Jr.

[57] ABSTRACT

A beach chair having multiple rollers is provided which is electrically insulated and that is quiet when rolled upon a hard surface. The frame of the beach chair is curved to fit the curves of the human body so that the weight is evenly distributed over the whole body surface. Thus, edema due to excessive pressure on small body surface areas is eliminated. The open, hollow construction of both the frame and the rollers allows water to enter and exit easily. In this way the chair remains stable and does not float away with wave action. The mulitple, independent rollers allow this lightweight beach chair to turn easily while gripping the sand so that it does not slide sideways. This beach chair rolls easily allowing it to be useful in transporting heavy items over long distances effortlessly over sand, gravel, or pavement without noise.

6 Claims, 2 Drawing Sheets

MULTI-ROLLER BEACH CHAIR

This is a continuation-in-part of application Ser. No. 08/901,496, now U.S. Pat. No. 5,845,969, filed on Jul. 28, 1997.

BACKGROUND OF THE INVENTION

This invention relates to rolling beach chairs that are adapted to roll on beach sand.

Graham in U.S. Pat. No. 5,362,079 discloses a beach caddy that is a triangular trailer to which a beach chair may be attached to transport articles on the beach. The wheels are not part of the chair, but are attached to the trailer that can carry a chair. Since there are two wheels on either end, the caddy does not support much weight on loose beach sand, sinks into the sand and does not roll well.

Dominko in U.S. Pat. No. 4,376,547 and Spurrier et al. in U.S. Pat. No. 5,423,592 both disclose a lounge chair with two separated wheels. However, when loaded with the full weight of a person, these wheels will sink into loose sand deeply enough to comtaminate the bearings. These wheels will not roll easily in loose beach sand when fully loaded with the full weight of a substantial adult.

Goad, Sr. in U.S. Pat. No. 5,403,220 discloses a jet-propelled floating chair that is supported by elongated floats and a buoyant roller that allows the chair to roll on dry land. The roller is specified to be made of foam plastic which is buoyant and which serves to roll the assembly over dry land. However, the foam roller will only support an empty chair on dry land. This foam roller is not a coating over a strong material and would be damaged and destroyed under the weight of a substantial adult seated in the chair and the foam would disintegrate upon rolling the chair with an adult human seated therein. Therefore, the chair is not designed for loaded use on beach sand.

Maturo, Jr. et al. in U.S. Pat. No. 3,677,571, Hansen-Smith et al. in U.S. Pat. No. 4,838,608, Farrell in U.S. Pat. No. 3,290,089, Stenwall in U.S. Pat. No. 3,758,128, Mazzarelli et al. in U.S. Pat. No. 3,693,993 and Kuchinsky, Jr. in U.S. Pat. No. 4,659,142 all describe beach chairs having rolling cylinders. However, none of the cylinders and wheels of the prior art have holes through the cylinder wall to improve traction and none are coated with a sound deadening, electrically insulating, and resilient coating. None of this prior art discloses a multi-roller chair having a curved tubular frame ergonomically designed.

SUMMARY OF THE INVENTION

An object of the present invention is to address the foregoing drawbacks and deficiencies and provide an improved rolling beach chair that does not sink into loose sand and contaminate the hardware with sand. Another object is to provide a beach chair that can roll while supporting an adult human without damage to itself and without digging into the sand, and without noise when rolling over pavement. Another object is to provide a beach chair with rolling means that is lightweight, easy to transport, folding and that accommodates outdoor weather conditions at the beach without conducting electricity to ground. Another object of the present invention is to provide a rolling beach chair that will not easily roll away and blow away in the wind and waves.

These and other objects are achieved in the present invention by an ergonomically curved multi-roller beach chair having at least two insulatively coated tubular rollers having holes through the roller surfaces.

These and other objects and advantages will be more clearly understood from the following description when read in conjunction with the appended drawings.

DESCRIPTION OF PREFERRED EMBODIMENTS

Figure 1:
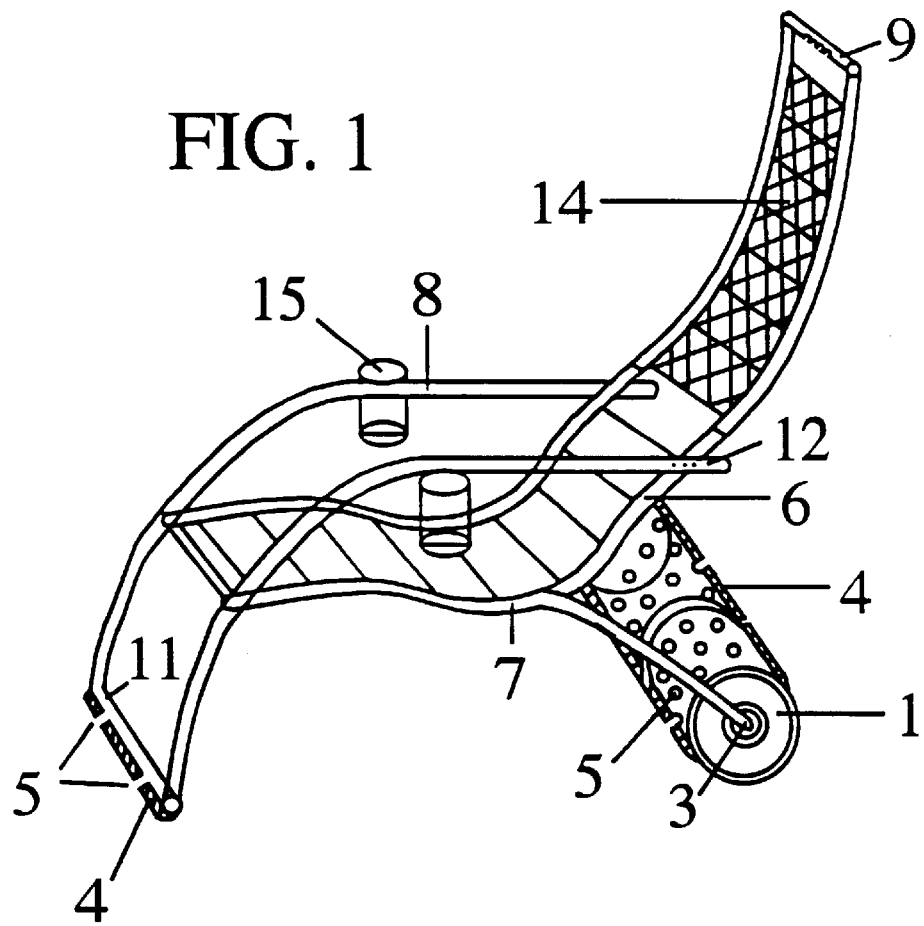
FIG. 1 is a side view of a rolling beach chair.
Figure 2:
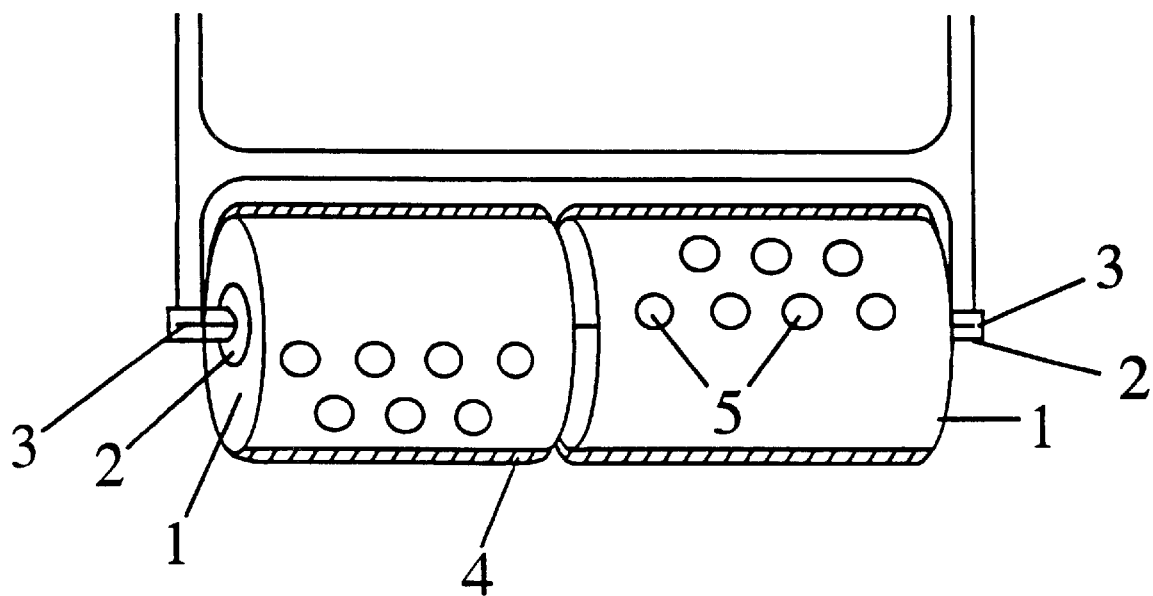
FIG. 2 is a rear cross-sectional view of the cylindrical rollers of the chair of FIG. 1 of the first embodiment.

The present invention is a rolling beach chair having a roller adapted to roll over beach sand and coated with an insulating, resilient coating and having a tubular folding frame which is curved to fit the human body curves as shown in FIG. 1. At least two rollers 1 are rotatively attached to the parallel tubular back legs with inert bushings 2 and circumferentially disposed about about an axle 3 connecting the back legs of the chair. The cylinrical roller of the first embodiment is shown in FIG. 2. The bushings 2 are made of a material selected from nylon, Teflon®, polyvinylchloride, and plastic. The roller 1 is made of a lightweight material, preferrably aluminum, and coated with a resilient insulative coating 4, preferrably rubber.

The roller 1 is hollow and has holes 5 through both the circumferential surface of the hollow cylinder and the coating 4. The holes 5 are at most 10 cm in width, so that the roller 1 does not sink into beach sand. Both the tubular support frame and the cylindrical rollers are open and hollow with perforations or holes 5, so that water may enter and exit easily. In this way the chair remains fixed and does not float away when waves wash over the chair at the beach. This greatly reduces the overall weight of the chair. The edges of the holes 5 provide traction in the sand to prevent sideways slipping. The resilient coating 4 is an electrical insulator, so that the chair will not act as an electrical ground during lightning, for example. The coating 4 also absorbs sound, so that it will be silent when rolled upon a hard surface, such as pavement and concrete. The tubular frame of the beach chair is ergonomically curved to comfortably fit human body curves. The folding frame includes a curved convex lumbar support 6, a curved gluteus support 7, arm rest supports 8, all built into the tubular frame of the chair. This distributes weight and stress over a much greater percentage of the body surface area than the straight frames of the prior art. The tubular frame and roller 1 are made of a material selected from aluminum, tin, titanium, Kevlar®, polymeric hydrocarbon, fiber reinforced resin, polyvinylchloride, plastic, and wood. Adjustable backrest arms 12 are shown in FIG. 1. The front legs of the beach chair are connected to each other at the bottom by a tubular frame section 11 that is coated with the same electrically insulative sound absorbing coating that is used to coat the roller 1. The top and bottom tubular frame members 9 & 11 are handles used to lift and roll the beach chair on the roller 1 and are also coated with the roller coating described above. At least one pocket 14 is attached to the chair. There are holes 5 in the roller surface and frame in all embodiments. At least one drink holder 15 is attached to the arm support 8.

Figure 3:
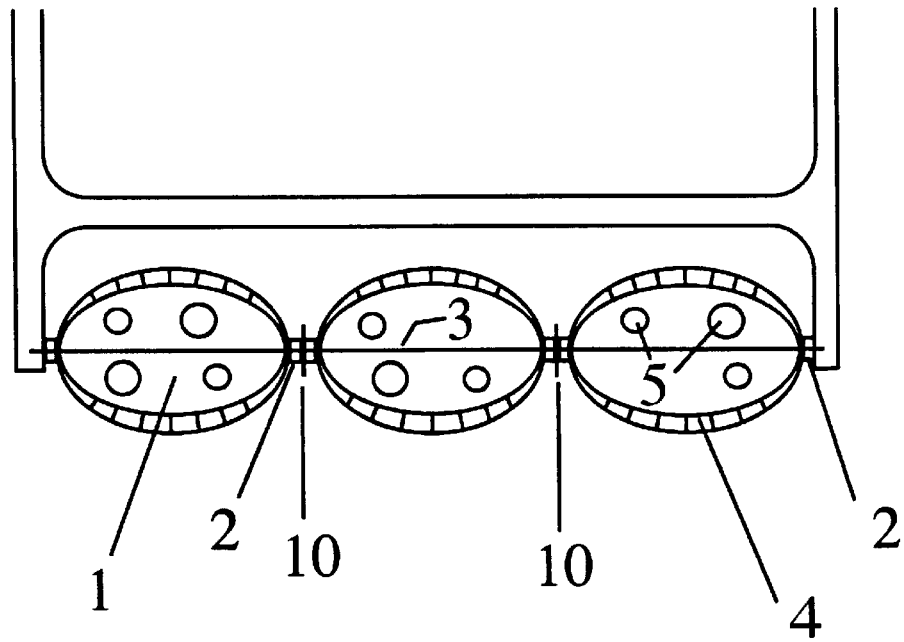
FIG. 3 is a rear cross-sectional view of the ellipsoidal rollers of the chair of FIG. 1 of the second embodiment.

Another roller 1 in the beach chair of FIG. 1 is shown in FIG. 3 wherein there are at least two ellipsoidal rollers separated from each other by bushings 2 and spacers 10. This modification reduces the weight of the roller 1 and further improves sideways traction in beach sand. Each ellipsoidal roller rotates independently of the others to facilitate turning and rolling over uneven terrain. The rollers are made of the same materials and coated as recited above.

Figure 4:
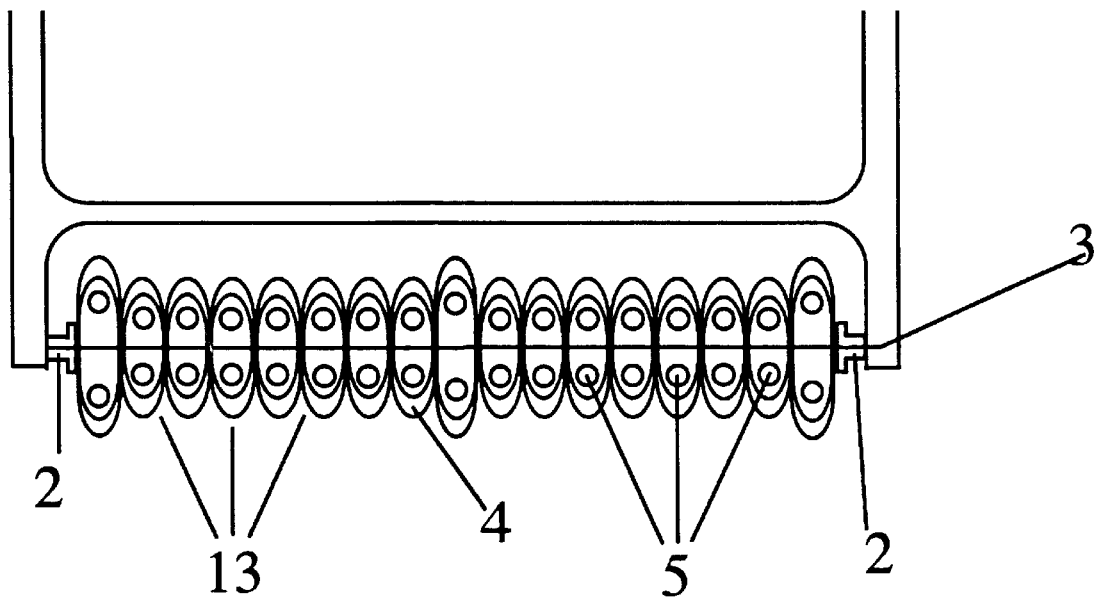
FIG. 4 is a rear cross-sectional view of the tubular rollers of the beach chair of the third embodiment.

FIG. 4 shows another roller of the beach chair shown in FIG. 1 in which the substantially cylindrical roller is made up of many small circular tubular sections 13. Each of these circular tubular sections is coated with a sound absorbing, electrically insulative coating 4. Lateral traction is provided by the grooves between the circular tubular sections 13 as well as by the edges of the holes 5 to prevent sideways slip when the chair is rolled over uneven loose sand and other surfaces.

Accordingly for all these reasons set forth, the present invention provides an improvement in the art of rolling beach chairs and has substantial commercial merit.

The present invention shall not be limited to the novel constructions and use as shown and described, but shall be limited only by the scope of the appended claims.

What is claimed is:

1. A rolling beach chair comprising a hollow tubular frame, said frame including a curved convex lumbar support, a curved concave gluteus support, and two arm supports, the curvature of each of said supports being integral to said frame, said frame having two back legs with at least two hollow tubular rollers being rotatively attached to said back legs and being disposed about an axle connecting said back legs, the exterior surface of said roller being coated with a resilient electrically insulative sound absorbing coating, said frame having two front legs connected to each other at their bottom ends by a hollow tubular frame section, said frame section being coated on a bottom surface with said coating.

2. The chair according to claim 1 wherein said rollers are ellipsoidal in their surface geometry, said rollers are rotatively attached to said back legs with bushings, said bushings are constructed from a material selected from nylon, hydrocarbon polymer, polyvinylchloride, and plastic, said rollers are separated from each other by bushings and spacers, both said frame and said rollers are constructed from a material selected from aluminum, tin, titanium, hydrocarbon polymer, polyvinylchloride, plastic, wood, and fiber reinforced resin, said frame section having holes penetrating both said coating and said frame.

3. The chair according to claim 1 wherein said hollow rollers have holes in the circumferential surface penetrating both said rollers and said coating, said rollers roll independently of each other, and at least one pocket and at least one drink holder are attached to said chair, and said chair is a folding chair.

4. A beach chair with rollers comprising a hollow tubular frame, said frame including a curved convex lumbar support, a curved concave gluteus support and an arm support, the curvature of each said support being integral to said frame, said frame having two back legs, at least three hollow tubular rollers being rotatively attached to said back legs about an axle connecting said back legs, the exterior circumferential surface of said tubular rollers being coated with a resilient electrically insulative sound absorbing coating, said frame having at least two front legs.

5. The chair according to claim 4 wherein said hollow tubular rollers have holes penetrating both said circumferential surface and said coating of said rollers, said frame has perforations penetrating said hollow frame, said chair includes at least one pocket, said rollers roll independently of each other, and at least one drink holder is attached to said arm support of said chair.

6. The chair according to claim 5 wherein said chair is a folding chair, said front legs are connected to each other at their bottom ends by a hollow tubular frame section, said frame section is coated on a bottom surface with said coating, said frame section has holes penetrating through said coating and through a bottom surface of said frame section.

\* \* \* \* \*